United States Patent [19]
Ishiharada et al.

[11] Patent Number: 5,933,560
[45] Date of Patent: Aug. 3, 1999

[54] BRANCHED TYPE LIGHT TRANSMISSION SYSTEM

[75] Inventors: Minoru Ishiharada, Saitama-ken; Atsushi Hotta, Tokyo; Itsuo Tanuma, Saitama-ken, all of Japan

[73] Assignee: Bridgestone Corporation, Tokyo, Japan

[21] Appl. No.: 08/940,445

[22] Filed: Sep. 30, 1997

[30] Foreign Application Priority Data

Sep. 30, 1996 [JP] Japan ..................................... 8-280104
Sep. 30, 1996 [JP] Japan ..................................... 8-280105
Sep. 22, 1997 [JP] Japan ..................................... 9-275051

[51] Int. Cl.$^6$ ....................................................... G02B 6/04
[52] U.S. Cl. ........................................... 385/115; 385/120
[58] Field of Search ..................................... 385/115, 116, 385/119, 120, 121

[56] References Cited

U.S. PATENT DOCUMENTS

| | | |
|---|---|---|
| 3,814,497 | 6/1974 | Stone . |
| 4,009,382 | 2/1977 | Nath . |
| 4,573,761 | 3/1986 | McLachlan et al. ..................... 385/115 |
| 5,333,227 | 7/1994 | Ishiharada et al. . |

*Primary Examiner*—Phan T. H. Palmer
*Attorney, Agent, or Firm*—Jordan and Hamburg

[57] ABSTRACT

A branched type light transmission system including a plurality of light transmission tubes each comprising a flexible cylindrical cladding and a transparent core filled in the cladding and which has a higher index of refraction than the cladding. The core is made of an elastically deformable solid substance, and the plurality of light transmission tubes are bundled together at the light-incident ends thereof with a binding member and thus applied with an external pressure to deform each light transmission tube in order to minimize the clearance between the light transmission tubes.

5 Claims, 7 Drawing Sheets

BRANCHED TYPE LIGHT TRANSMISSION SYSTEM

BACKGROUND OF THE INVENTION

1. Field of the Invention

The present invention relates to a branched type light transmission system including a plurality of bundled light transmission tubes each comprising a flexible cylindrical cladding and a transparent core filled in the cladding and of which the refractive index is higher than that of the cladding.

2. Description of the Prior Art

Light transmission tubes comprising a flexible cylindrical cladding and a transparent core filled in the cladding are known from the disclosures in the U.S. Pat. Nos. 3,814,497 (Stone), 4,009,382(Nath) and 5,333,227(Ishiharada et al).

Stone discloses a liquid core multimode optical waveguide including a plurality of parallel spaced hollow fused quartz fibers each of which forms a light transmission tube. The fiber consists of a main body (cladding) and an organic liquid core filled in the main body. The liquid core is tetrachloroethylene or a mixture of tetrachloroethylene and carbon tetracloride.

Nath discloses a flexible light guide comprising a flexible hollow tube of plastic material, light transmissive means closing the tube at its ends and a light conducting liquid which has a refractive index greater than that of the plastic material of the tube and which completely fills the flexible tube between the light transmissive means to form a closed liquid light guide system. The light transmissive means is a window made of quartz or quartz glass. The light conducting liquid is an aqueous solution of an inorganic salt.

Ishiharada et al discloses an optical waveguide hose including a hollow tubular cladding, a fluid core in the cladding, the fluid core having a higher index of refraction than the cladding, and sealing plugs fitted in opposite end openings of the cladding.

Figure 1:
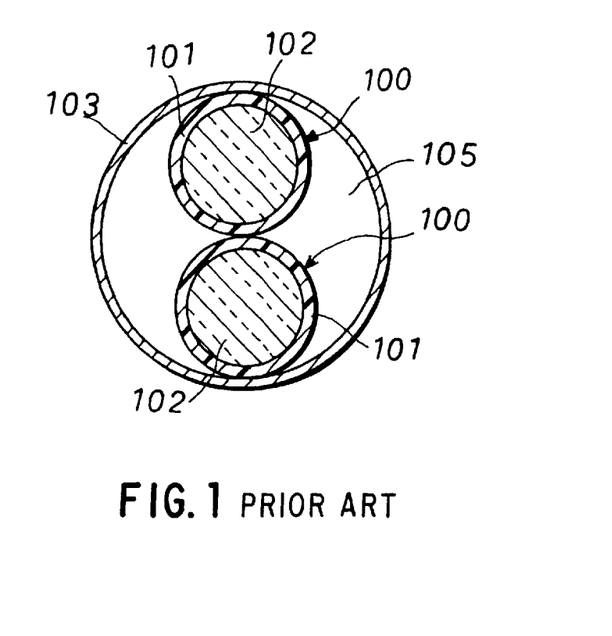
FIG. 1 is a sectional view of a prior art.

In all the prior-art light transmission tubes, a fluid is filled in a cladding and the cladding is sealed at either end thereof with a hard light transmissive window or sealing plug. To prevent the light-incident portion of the light transmission tube from being thermally broken or contaminated when light is incident from a high-power light source upon the tube, the window or sealing plug is made of an inorganic glass such as quartz glass. Pyrex grass, multicomponent glass or the like. Such light transmission tubes are bundled at the light-incident end for light transmission from a single light source upon the plurality of light transmission tubes. It has been tried to branch each of the light transmission tubes. A typical prior-art light transmission tube is shown in FIG. 1. As shown, a fluid core is filled in a flexible cylindrical cladding 101 and the cladding 101 is sealed at either end thereof with an inorganic glass sealing plug 102 to form a light transmission tube 100. Two such light transmission tubes 100 are bundled together at the light-incident ends thereof with a binding member 103. Light is incident from a high-power light source upon the end of the bundled tubes 100 for light transmission through the tubes 100.

In the prior-art light transmission tube shown in FIG. 1, since the inorganic glass sealing plugs 102 provided at the light-incident ends of the tubes 100 are not deformed due to any external force, the binding member 103 and tubes 100 define clearances 105 between them. When a light is incident upon these clearances, it cannot be efficiently incident upon each tube 100. In this prior-art light transmission tube, the filling rate of the tubes 100 in the binding member 103 is about 50%, which cannot assure any high efficiency of light incidence upon the tubes 100.

SUMMARY OF THE PRESENT INVENTION

Accordingly, the present invention has an object to overcome the above-mentioned drawbacks of the prior art by providing a branched type light transmission system comprising a plurality of flexible light transmission tubes through which light is transmitted to a corresponding number of places and adapted to provide an efficient incidence or light from a single light source to the light-incident end of each light transmission tube.

The above object can be accomplished by providing a branched type light transmission system including a plurality of light transmission tubes each comprising a flexible cylindrical cladding and a transparent core filled in the cladding and which has a higher index of refraction than the cladding, the core being made of an elastically deformable solid substance, the plurality of light transmission tubes being bundled together and the light-incident ends thereof with a binding member and applied with an external pressure to deform each light transmission tube in order to minimize the clearance between the light transmission tubes.

In the present invention, light supplied from a single light source to the light-incident end of each of the light transmission tubes bundled together with the binding member is efficiently-incident upon each of the tubes. The light thus efficiently incident upon the tubes can be transmitted efficiently through them to a corresponding number of destinations, thereby permitting to branch the light from a single source to a plurality of destinations.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
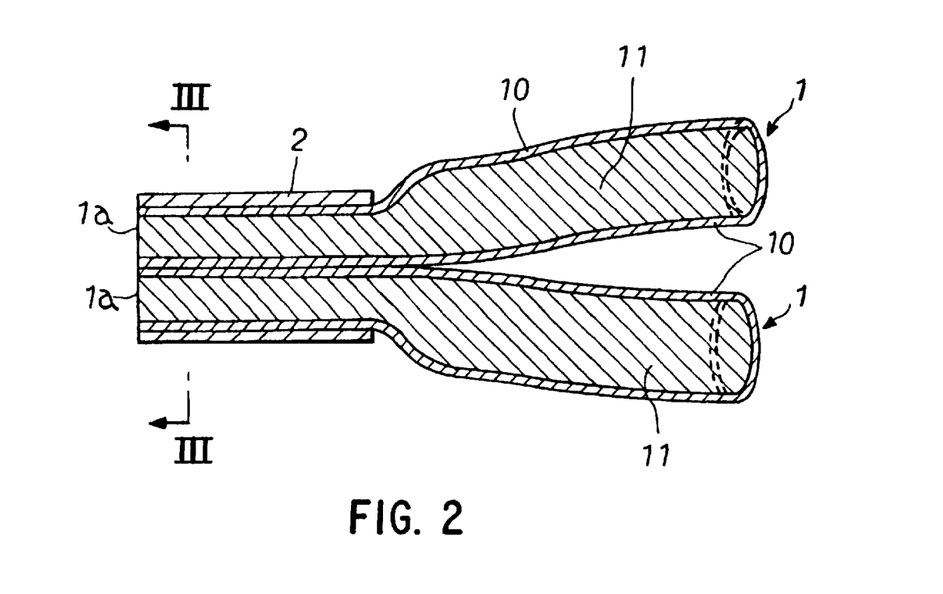
FIG. 2 is a sectional view of a preferred embodiment of the present invention, taken along the tube axis at the light-incident end.
Figure 3:
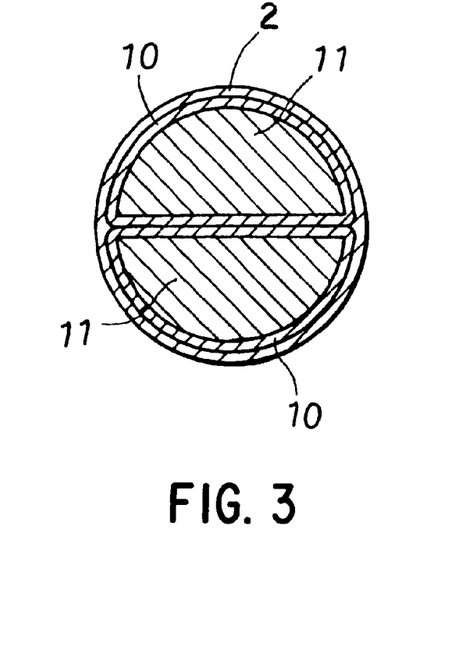
FIG. 3 is a sectional view taken along the line III—III in FIG. 2.

FIG. 2 shows a preferred embodiment of the present invention. In this embodiment. two light transmission tubes 1 are bundled together at light-incident ends 1a thereof with a binding member 2. When the tubes 1 are bundled with the binding member 2, they are applied with an external pressure and deformed at the light-incident ends 1a thereof to minimize the clearance between them inside the binding member 2. As a result of the binding with the member 2, the light transmission tubes 1 are deformed as shown in FIG. 3, resulting in little clearance between the tubes 1.

The light transmission tube 1 consists of a flexible cylindrical cladding 10 and a transparent core 11 filled in the cladding 10 and of which the index of refraction than that of the cladding 10. The cladding 10 should preferably be made of a flexible material which can be formed tubular and has a low index of refraction, such as plastic, elastomer. etc. More particularly, the material should be selected from the group including polyethylene, polypropylene, polyamide, polystyrene. ABS resin, polymethyl methacrylate, polycarbonate, polyvinyl chloride, polyvinylidene chloride, polyvinyl acetate, polyethylene acetate copolymer, polyvinyl alcohol, polyethylene polyvinyl alcohol copolymer, fluorocarbon resin, silicone resin, natural rubber, polyisoprene rubber, polybutadiene rubber, styrene butadiene copolymer, butyl rubber, butyl rubber halogenate, chloroprene rubber, allyl rubber, EPDM, acrylonitrile butadiene copolymer, fluoroelastomer, silicone rubber, etc. Among others, silicone polymer and fluorocarbon polymer which are low in index of refraction are most preferable materials for the cladding 10. More specifically, they include silicone polymers such as polydimethyl siloxane polymer, polymethyl phenyl siloxane polymer, fluorosilicone polymer, etc. and fluorocarbon thermoplastic elastomers such as polytetrafluoroethylene(PTFE), polychlorotrifluoroethylene (PTFE), polytetraethylene perfluoroalkoxyethylene copolymer(PFE), polycholorotrifluoroethylene(PCTFE), tetrafluoroethylene ethylene copolymer(ETFE), polyvinylidene fluororide, polyvinyl fluororide, fluorovinylidene trifluoroethylene copolymer, fluorovinylidene hexafluoropropylene copolymer, fluorovinylidene hexafluoropropylene tetrafluoroethylene terpolymer, tetrafluoroethylene propylene rubber, fluorocarbon thermoplastic elastomer. etc. Any one of these materials may be used singly or any two or more of them may be used as blended.

The core 11 should preferably be made of a soft material which is easily deformable, will not be broken even when deformed under pressure and will not have a change in index of refraction and loss of light transmittance caused by a difference in elasticity from one to another material. More particularly, the material for the core 11 should be selected from the group including alkyl acrylates such as methyl acylate. methyl methacrylate, etc., soft acryl polymers derived by copolymerization with such an alkyl acrylate of other acrylate or methacrylate which will provide a transparent copolymeriable polymer, silicone gel or other gel-state and rubber-state materials.

Figure 4:
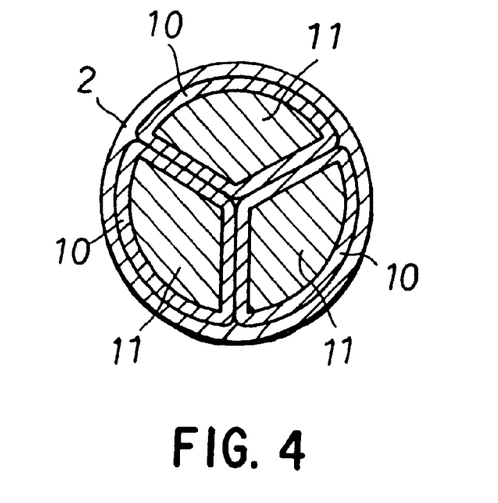
FIG. 4 is a sectional view similar to FIG. 3, showing three light transmission tubes bundled together.
Figure 5:
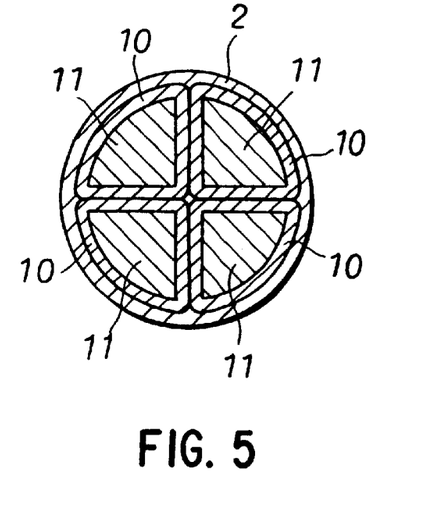
FIG. 5 is a sectional view similar to FIG. 3, showing four light transmission tubes bundled together.

FIG. 4 is a sectional view of the bundled portion of an embodiment of the present invention in which three light transmission tubes 1 are used together, and FIG. 5 is also a sectional view of the bundled portion of an embodiment in which four light transmission tubes 1 are used together.

In any of the above-mentioned embodiments, the core 11 of the light transmission tube 1 is made of a rubber-state elastic material. Therefore, the light transmission tubes 1 can be uniformly pressed and deformed by the binding member 2 so that they are packed evenly inside the binding member 2 at a high filling rate. To deform the commonly used glass-made optical fiber and plastic-made optical fiber, however, they themselves have to be softened and melted by heating, which needs much labor and cost. Also, for a uniform deformation of the fibers, they have to be heated uniformly and deformed under a uniform pressure, which however is difficult in practice. According to the present invention, however, the light transmission tubes 1 can easily be deformed uniformly.

The binding member 2 may be a cap, metal sleeve or the like. For bundling the light transmission tubes 1 together, the light-incident ends of them are inserted into the cap and then the cap is pressed to have a smaller diameter of the light transmission tubes 1. Otherwise, a heat-contractible tube may be used as the binding member 2. In this case, a plurality of the light transmission tubes 1 are introduced into the heat-contractible tube, the tube is heated for contraction to reduce the diameter of the light transmission tubes. If the compression of the light transmission tubes 1 is insufficient, the tubes 1 will not have any equal sectional area and will have a clearance between them. The clearance will cause an undesirably large loss of light incidence. On the contrary, if the light transmission tubes 1 are compressed excessively, the cores in the tubes 1 may possibly be broken, also resulting in a large loss of light incidence. Therefore, the total sectional area of the light transmission tubes before compressed should preferably 80 to 120% of that after compressed.

It should be noted that to protect the light transmission tube 1 according to the present invenition, the cladding 10 may be covered with a suitable sheath. The sheath may be made of plastic, elastomer, metal, glass, inorganic substance or the like. More specifically, the material may be selected from the group including high polymers such as polyamide, epoxy resin, polyvinyl chloride, polycararbonate, polystyrene, fluorocarbon resin, butyl rubber, butyl rubber halogenate, polyethylene, polypropylene, polyurethane, hydrochlorinated rubber, natural rubber, polyisoprene rubber, polybutadiene rubber, chloroprene rubber, acryl rubber, EPDM, fluoroelastomer, etc. Any one of them may be applied to the cladding 10 by coating, extrusion molding, taping, heat contraction or any other suitable means. Otherwise, the cladding 10 having the core filled therein may be inserted into a pipe, bellows or a spiral wire formed from a metal such as SUS, aluminium, copper, iron or the like or any of the high polymers. Furthermore, a metal may be applied as a film to the outer surface of the cladding 10 by plating, evaporation or spattering.

The above-mentioned sheath may be provided to protect the light transmission tube 1 as well as to shield the light from the tube 1 or allow the light to emerge at a predetermined portion of the tube 1. By making a hole at a predetermined portion of the sheath or removing the sheath at such portion, for example, the light will emerge from the tube through that portion. In this way, the light transmission tube may be formed into a light emitter to provide many light spots or lines.

EXAMPLE 1

Two light transmission tubes 1 each consisting of a core 11 made of a soft acryl polymer of 1.48 in index of refraction and a cladding 10 made of FEP, one of the cores 11 having an outside diameter of 7 mm while the other had an outside diameter of 8 mm, were prepared. The light-incident ends 1a of the tubes 1 were inserted into a cap (binding member 2) of 16 mm in inside diameter and 30 mm in length. The cap was caulked until it had an inside diameter of 12.5 mm. The sectional shape of the thus caulked portion of the light transmission tubes 1 is shown in FIG. 3. The rate of filling in the binding member 103 (cap) of the light transmission tubes (shown in FIG. 1) not caulked was about 50% while that of the light transmission tubes according to the present invention was almost 100%.

The light transmission through the two branch light transmission tubes (#1 and #2) of 1 m in length, thus finished, was measured using a 100-W optical fiber light source device. The results are shown in Table 1.

EXAMPLE 2

The cladding 10 was made of a dimethyl silicone tube of 5 mm in inside diameter and 0.5 mm in wall thickness and of which the inner surface was applied with a coating of fluoroelastomer. The core 11 was made of a silicone gel of which the index of refraction was 1.50. Three light transmission tubes 1 were prepared using such cladding 10 and core 11. After the light-incident ends 1a of the tubes 1 were inserted into a cap of 17 mm in inside diameter and 30 mm in length, the cap was compressed by caulking until it had an inside diameter of 13 mm. The sectional shape of the thus caulked potion of the light transmission tubes 1 is shown in FIG. 4. The rate of filling in the cap of the light transmission tube not caulked was about 65% while that of the light transmission tubes according to the present invention was almost 100%.

The light transmission through the three branch light transmission tubes (#1 to #3) of 1 m in length, thus finished, was measured using a 100-W optical fiber light source device. The results are shown in Table 1.

Comparative Example 1

Two light transmission tubes each consisting of a core made of a soft acryl polymer of 1.48 in index of refraction and a cladding made of FEP, one of the cores having an outside diameter of 7 mm while the other had an outside diameter of 8 mm, were prepared. The light-incident ends of the tubes were inserted into a cap of 16 mm in inside diameter and 30 mm in length. The sectional shape of the thus caulked portion of the tubes is as shown in FIG. 1. The light transmission through the two branch light transmission tubes (#1 and #2) of 1 m in length, thus finished, was measured using a 100-W optical fiber light source device. The results are shown in Table 1.

TABLE 1

| | (unit:1 ux) | | | |
|---|---|---|---|---|
| Branch tube | #1 | #2 | #3 | Total light transmission |
| Example 1 | 320 | 300 | | 620 |
| Example 2 | 165 | 180 | 189 | 514 |
| Comparative example 1 | 173 | 151 | | 324 |

Figure 6:
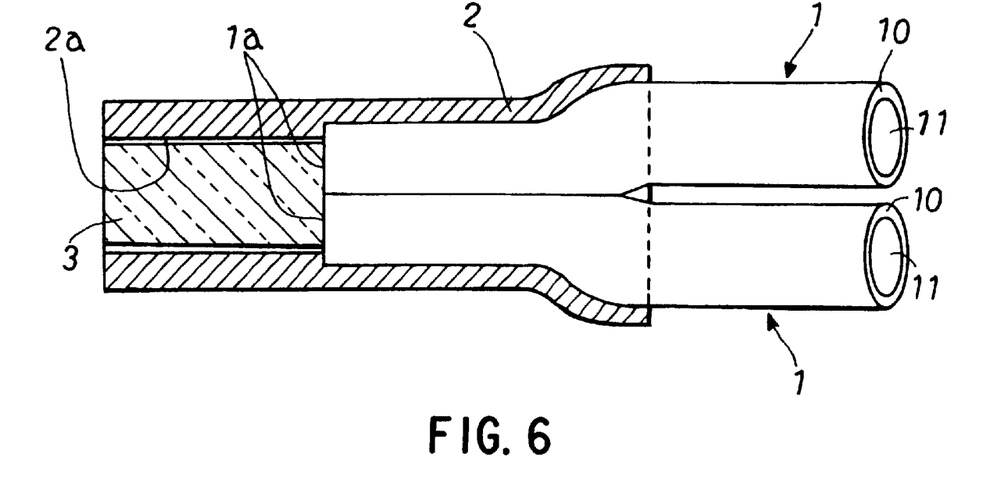
FIG. 6 is a sectional view of an embodiment provided with a light incidence window at the light-incident end, taken along the tube axis.

FIG. 6 shows another embodiment of the present invention. In this embodiment, a window 3 is joined to the light-incident end faces of the two light transmission tubes 1 bundled together with the binding member 2. The binding member 2 is extended from the light-incident end 1a and the window 3 is provided in a bore 2a of the extension. The joined area of the window 3 is designed smaller than that of the light-incident end face of the bundled tubes 1, thereby improving the. efficiency of light incidence.

The window 3 is made of a material selected from the group including inorganic glass such as quartz glass, Pyrex glass, multi-component glass, BK-7 glass, sapphire, crystal and organic glass and transparent plastic such as polyethylene, polypropylene, ABS resin, acrylonitrile styrene copolymer, styrene butadiene copolymer, acrylonitile EPDM styrene terpolymer, styrene methyl metbacrylate copolymer, methacryl resin, epoxy resin, polymethyl pentene, allyl diglycol carbonate resin, spirane resin, amorphous polyolefin, polycarbonate, polyamide, polysulfone, polyallyl sulfone, polyether sulfone, polyether imide, polyimide, polyethylene terephthalate, diallyl phthalate, fluorocarbon resin, polyester carbonate, silicone resin, etc. Among others, the inorganic glass such as quartz glass, Pyrex glass and multi-component glass are clear, highly heat-resistant and chemically stable, and so they will not chemically react with the core with which they are in contact at the inner end faces thereof and gas or water with which they are in contact at the outer end faces thereof. Thus, the window made of such material will keep its excellent performance for a long term.

EXAMPLE 3

The cladding 10 was made of a dimethyl silicone tube of 2 mm in inside diameter and 0.5 mm in wall thickness and of which the inner surface was applied with a coating of fluoroelastomer. The core 11 was made of a silicone gel of which the index of refraction was 1.50. Three light transmission tubes 1 were prepared using such cladding 10 and core 11. After the light-incident ends 1a of the tubes 1 were inserted into a cap (binding member 2) of 17 mm in inside diameter, the cap was compressed by caulking until it had an inside diameter of 13 mm. A window 3 made of BK-7 glass of 10 mm in diameter and 30 mm in length and of which the index of refraction was 1.49 was joined to the light-incident end face of the tubes 1 compressed by the caulked cap. The light transmission through the three branch light transmission tubes (#1 to #3) of 1 m in length, thus finished, was measured using a 100-W optical fiber light source device.

The results are shown in Table 2.

EXAMPLE 4

Two light transmission tubes 1 each consisting of a core 11 made of a soft acryl polymer of 1.48 in index of refraction and a cladding 10 made of FEP, one of the cores 11 having an outside diameter of 7 mm while the other had an outside diameter of 8 mm, were prepared. The light-incident ends 1a of the tubes 1 were inserted into a cap (binding member 2) of 16 mm in inside diameter. The cap was caulked until it had an inside diameter of 12.5 mm. A window 3 made of BK-7 glass of 10 mm in diameter and 30 mm in length and of which the index of refraction was 1.49 was joined to the light-incident end face of the tubes 1 compressed by the caulked cap. The light transmission through the two branch light transmission tubes (#1 and #2) of 1 m in length, thus finished, was measured using a 100-W optical fiber light source device.

The results are shown in Table 2.

EXAMPLE 5

The cladding 10 was made made of a dimethyl silicone tube of 4 mm in inside diameter and 0.5 mm in wall thickness and of which the inner surface was applied with a coating of fluoroelastomer. The core 11 was made of a silicone gel of which the index of refraction was 1.50. Three light transmission tubes 1 were prepared using such cladding 10 and core 11. After the light-incident ends 1a of the tubes 1 were inserted into a cap of 17 mm in inside diameter and 30 mm in length, the cap was compressed by caulking until it had an inside diameter of 11 mm. A window 3 made of BK-7 glass of 10 mm in diameter and 30 mm in length and of which the index of refraction was 1.49 was joined to the light-incident end face of the tubes 1 compressed by the caulked cap. The light transmission through the tube branch light transmission tubes (#1 to #3) of 1 m in length, thus finished. was measured using a 100-W optical fiber light source device.

The results are shown in Table 1.

Comparative example 2

Two light transmission tubes each consisting of a core made of a soft acryl polymer of 1.48 in index of refraction and a cladding made of FEP, one of the cores having an outside diameter of 7 mm while the other has an outside diameter of 8 mm, were prepared. They were inserted into a cap of 16 mm in inside diameter. A window made of BK-7 glass of 10 mm in diameter and 30 mm in length and of which the index of refraction was 1.49 was joined to the light-incident end face of the tubes 1 in the cap of 16 mm in inside diameter. The light transmission through the two branch light transmission tubes (#1 and #2) of 1 m in length, thus finished, was measured using a 100-W optical fiber light source device.

TABLE 2

| | (unit:1 ux) | | | |
|---|---|---|---|---|
| Branch tube | #1 | #2 | #3 | Total light transmission |
| Example 3 | 160 | 165 | 169 | 494 |
| Example 4 | 295 | 300 | | 595 |
| Example 5 | 140 | 134 | 133 | 407 |
| Comparative example 2 | 162 | 150 | | 312 |

Figure 7:
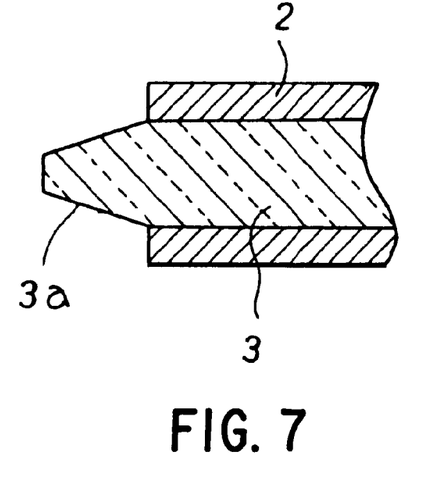
FIG. 7 is a sectional view of a variant of the light-incident window.
Figure 8:
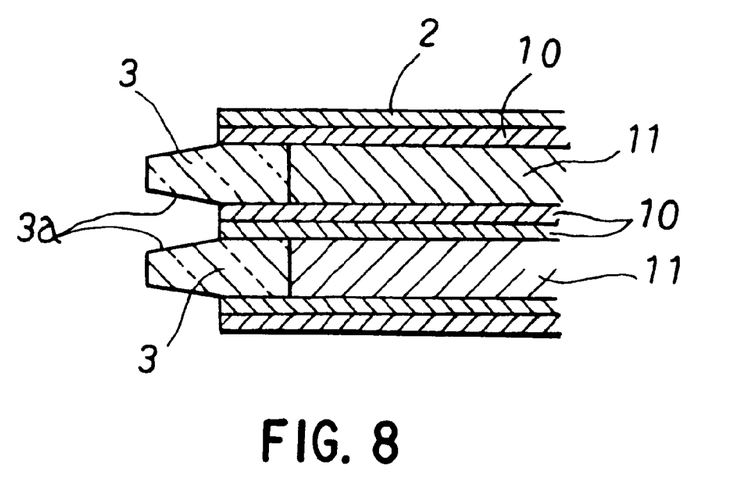
FIG. 8 is a sectional view of an embodiment in which a light-incident window is provided for each light transmission tube.

FIG. 7 shows an embodiment in which the outer end 3a of the window 3 is tapered, which contributes to an improved efficiency of light incidence. FIG. 8 also shows an embodiment in which the outer ends 3a of the window 3 are tapered. In this embodiment, however, the window 3 is inserted and joined into the cladding 10 deformed as pressed by the binding member 2 on the light transmission tubes 1. The tapering of the outer ends 3a of the window 3 increase the light incidence.

Figure 9:
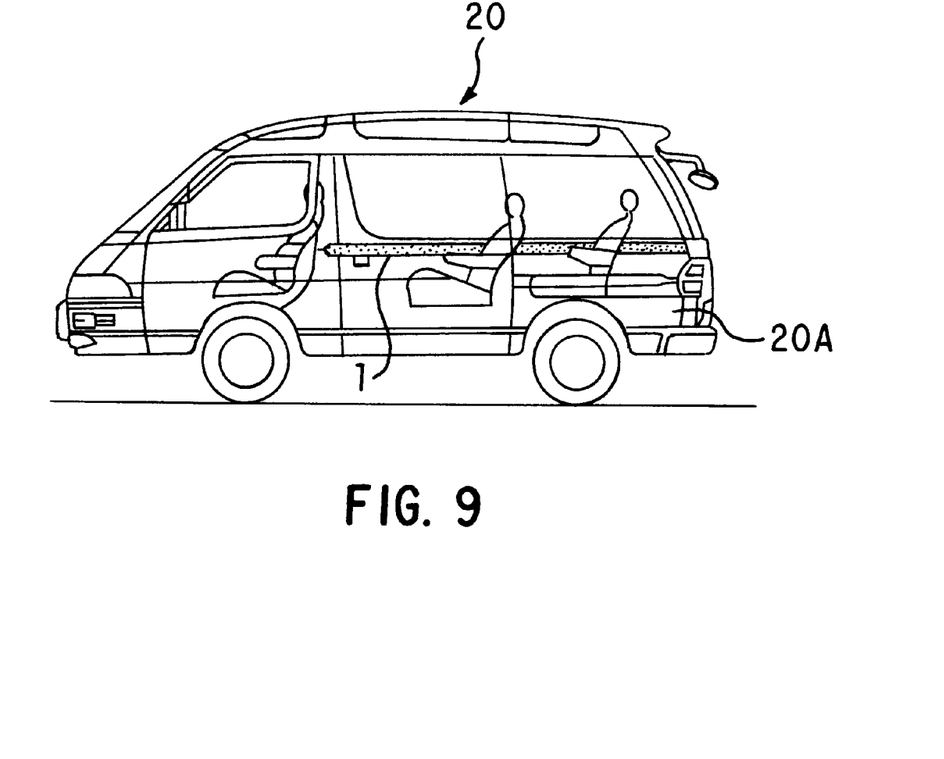
FIG. 9 is a side elevation of the light transmission tube branched to an automobile inside.

FIG. 9 shows an example of the application of the branched type light transmission system according to the present invention in which the branched tubes 1 are laid along the inner wall of the cabin 20A of an automobile 20.

Figure 10:
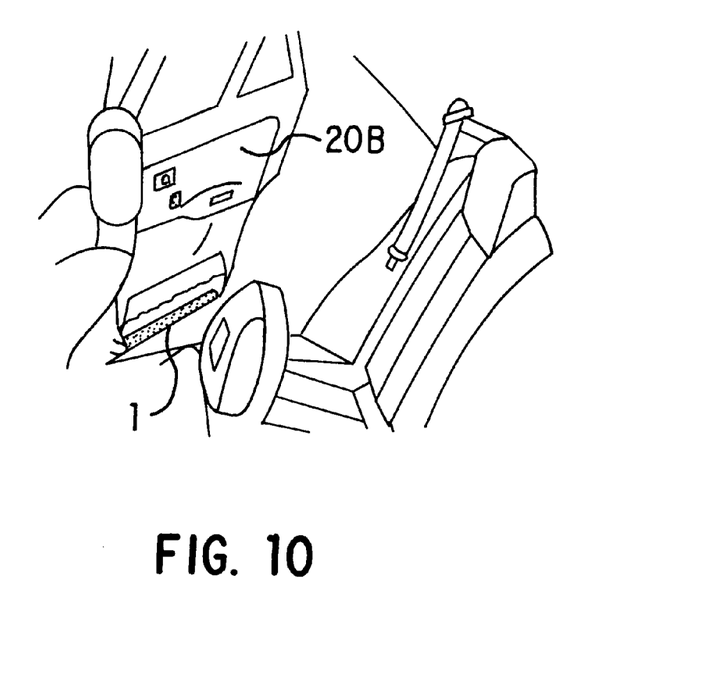
FIG. 10 is a perspective view of the light transmission tube branched to inside an automobile door.

FIG. 10 shows another example of the application in which the branched light transmission tubes 1 are laid inside the door 20B of an automobile 20.

Figure 11:
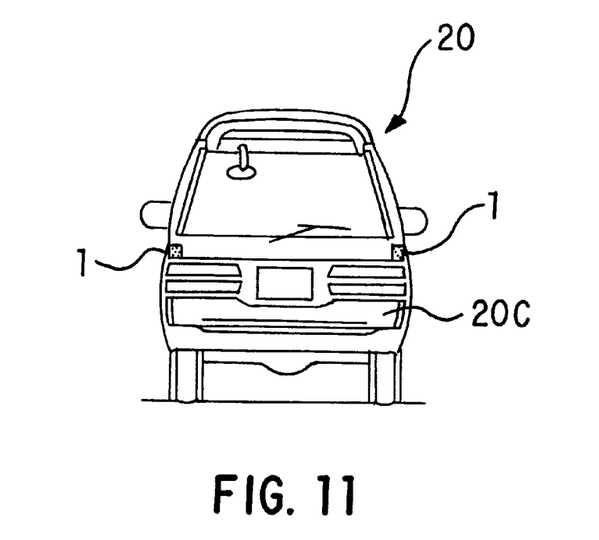
FIG. 11 is a rear view of the light transmission tube branched as automobile tail light.

FIG. 11 shows a still another example of the application in which the branched light transmission tubes 1 are used as tail lights at the rear 20C of an automobile 20.

Figure 12:
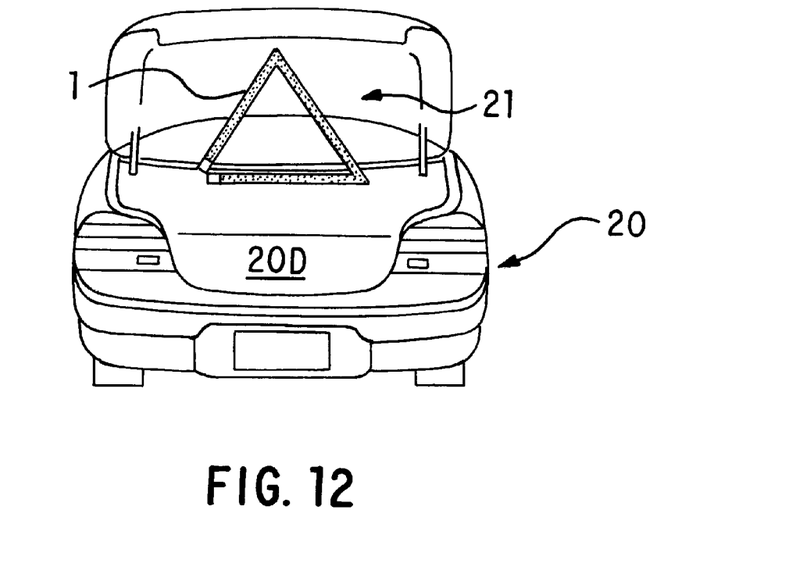
FIG. 12 is a rear view of the light transmission tube branched to an emergency stop sign board provided in an automobile trunk room.

FIG. 12 shows a yet another example of the application in which the branched light transmission tubes 1 are disposed on an emergency stop sign board 21 provided inside the trunk room 20D of an automobile 20.

Figure 13:
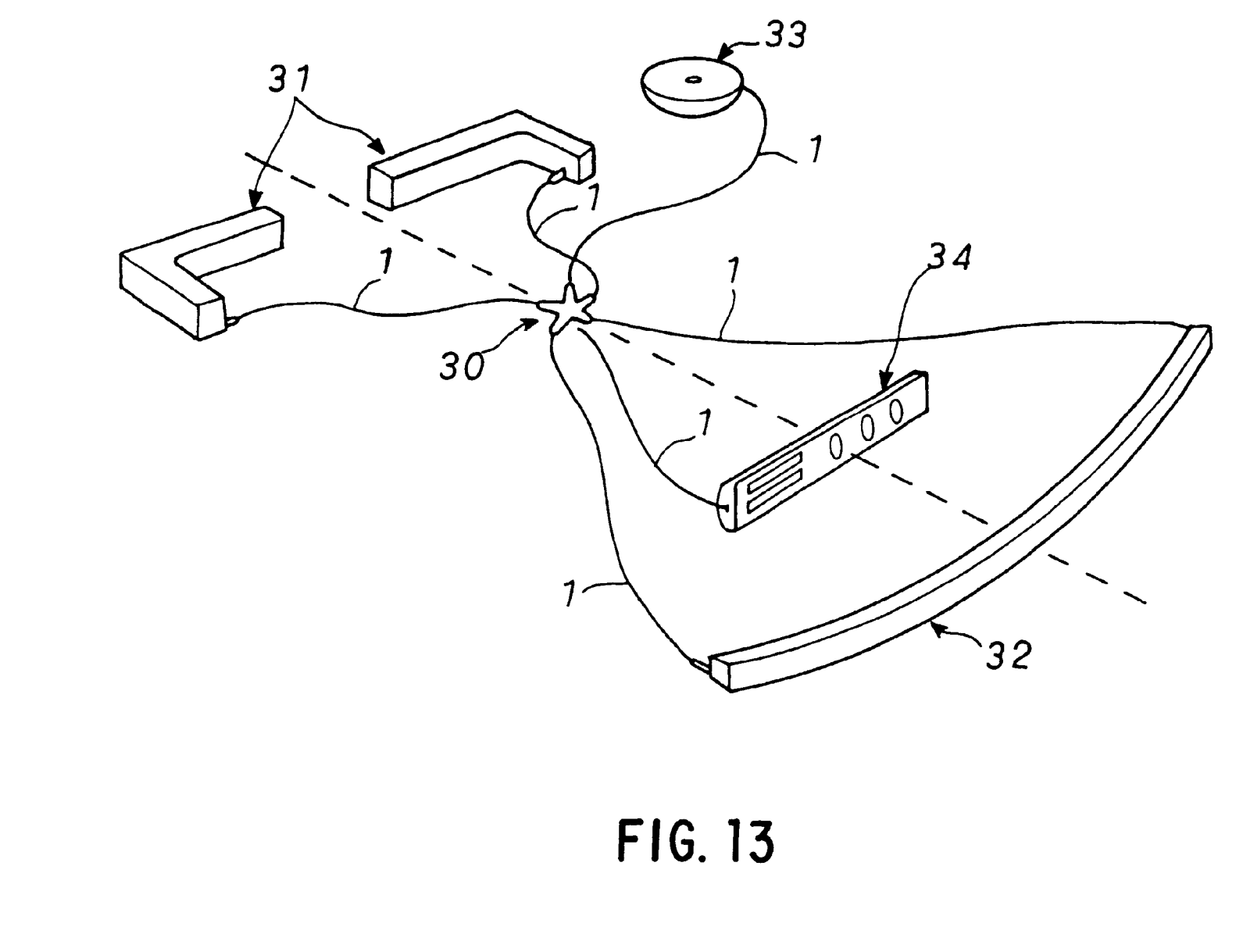
FIG. 13 shows the light transmission tube branched from a light source to various lights of an automobile.

FIG. 13 shows a yet another example of the application in which the light transmission tubes 1 branched from a single light source 30 are extended to tail lights or brake lights 31, forward lighting system 32, dome light 33 and instrument panel 34 of an automobile. Thus the light transmission tubes 1 can be distributed to various illuminations of an automobile to save energy and space.

Since the branched type light transmission system according to the present invention can transmit a sufficient amount of light through each of the light transmission tubes bundled together, branching the light transmission tubes permit to illuminate a plurality of destinations or project lights from a single light source. It needs no many light sources or light emitters.

What is claimed is:

1. A branched type light transmission system including a plurality of light transmission tubes each comprising a flexible cylindrical cladding and a transparent core filled in the cladding and which has a higher index of refraction than the cladding, the core being made of an elastically deformable solid substance, the plurality of light transmission tubes being bundled together at the light-incident ends thereof with a binding member and thus applied with an external pressure to deform each light transmission tube in order to minimize the clearance between the light transmission tubes.

2. A light transmission system as set forth in claim 1, wherein a light-incident window is joined to the light-incident end faces of the bundled light transmission tubes.

3. A light transmission system as set forth in claim 2, wherein the joined area of the light-incident window is made smaller than that of the light-incident end faces of the bundled light transmission tubes.

4. A light transmission system as set forth in claim 2 or 3, wherein the light-incident window is tapered as it goes away from the light-incident ends of the bundled light transmission tubes.

5. A light transmission system as set forth in claim 1, wherein the core is made of a polymer or silicone gel derived from copolymerization of two different kinds of alkyl acrylates or from copolymerization of alkyl acrylate and methacrylate.

* * * * *